United States Patent
Kaufman et al.

(10) Patent No.: US 7,137,062 B2
(45) Date of Patent: Nov. 14, 2006

(54) SYSTEM AND METHOD FOR HIERARCHICAL SEGMENTATION WITH LATENT SEMANTIC INDEXING IN SCALE SPACE

(75) Inventors: James H. Kaufman, San Jose, CA (US); Dulce Beatriz Ponceleon, Palo Alto, CA (US); Malcolm Slaney, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/034,523

(22) Filed: Dec. 28, 2001

(65) Prior Publication Data

US 2004/0205461 A1    Oct. 14, 2004

(51) Int. Cl.
    *G06F 3/00*    (2006.01)
(52) U.S. Cl. ..................................... 715/500
(58) Field of Classification Search ............. 73/597; 704/207; 367/100, 127; 708/813; 715/512, 715/723, 500, 513, 517, 523, 530; 345/614; 707/101; 725/22
    See application file for complete search history.

(56) References Cited

U.S. PATENT DOCUMENTS

| | | | | |
|---|---|---|---|---|
| 4,658,372 A | | 4/1987 | Witkin .......................... | 364/550 |
| 4,839,853 A | | 6/1989 | Deerwester et al. .......... | 364/900 |
| 4,850,022 A | * | 7/1989 | Honda et al. ................. | 704/207 |
| 4,995,011 A | * | 2/1991 | Spiesberger .................. | 367/127 |
| 5,113,367 A | * | 5/1992 | Marrian et al. ............... | 708/813 |
| 5,301,109 A | | 4/1994 | Landauer et al. ......... | 364/419.19 |
| 5,355,161 A | * | 10/1994 | Bird et al. ..................... | 725/22 |
| 5,428,774 A | * | 6/1995 | Takahashi et al. ........... | 707/101 |
| 5,455,806 A | * | 10/1995 | Hutson .......................... | 367/100 |
| 5,544,352 A | | 8/1996 | Egger ........................... | 395/600 |
| 5,550,965 A | * | 8/1996 | Gabbe et al. ................. | 715/512 |
| 5,557,297 A | * | 9/1996 | Sharp et al. .................. | 345/614 |
| 5,799,276 A | | 8/1998 | Komissarchik et al. ...... | 704/251 |
| 5,956,026 A | * | 9/1999 | Ratakonda .................... | 715/723 |
| 5,963,205 A | | 10/1999 | Sotomayor ................... | 345/333 |
| 5,996,415 A | * | 12/1999 | Stanke et al. ................. | 73/597 |
| 6,070,133 A | | 5/2000 | Brewster et al. ............. | 704/9 |
| 6,137,544 A | | 10/2000 | Dimitrova et al. .......... | 348/700 |
| 6,161,084 A | | 12/2000 | Messerly et al. ............. | 704/9 |
| 6,175,829 B1 | | 1/2001 | Li et al. ......................... | 707/3 |

OTHER PUBLICATIONS

Jean Babaud, Andrew P. Witkin, Michel Baudin, Richard O. Duda, "Uniqueness of the Gaussian Kernel for Scale-Space Filtering", IEEE Transactions on Pattern Analysis and Machine Intelligence, vol. PAMI-8, No. 1, p. 26-33, Jan. 1986.

(Continued)

*Primary Examiner*—Stephen Hong
*Assistant Examiner*—Kyle Stork
(74) *Attorney, Agent, or Firm*—Marc D. McSwain (57) ABSTRACT

A system and method for automatically generating a hierarchical table of contents or outline for indexing a document and identifying clusters of related information in the document. The document may comprise text, audio, video, or a multimedia presentation. The invention employs a unique and novel combination of latent semantic indexing techniques to identify related blocks and major topic changes within the document with scale space segmentation techniques to respectively identify self-similar blocks within the document and to thus find topic changes of various sizes at block edges. The invention then produces a visual presentation of the semantic structure of the document.

4 Claims, 7 Drawing Sheets

OTHER PUBLICATIONS

F. Choi, "Advances in domain independent linear text segmentation", Proceedings of NAACL'00, Seattle, USA, Apr. 2000.

S. Deerwester, S. Dumais, G. Furnas, T. Landauer, R. Harshman, "Indexing by Latent Semantic Analysis", Journal of the American Society for Information Science, 41, p. 391-407, 1990.

M.K. Hughey, M.W. Berry, "Improved query matching using kd trees: a latent semantic indexing enhancement", Information Retrieval (USA), vol. 2, No. 4, 2000, p. 287-302.

Johnathan Foote, "Visualizing Music and Audio using Self-Similarity", Proceedings of ACM Multimedia'99, p. 77-80, Orlando, Florida, Nov. 1999.

Marti A. Hearst, "Multi-Paragraph Segmentation of Expository Text", Proceedings of the 32$^{nd}$ Annual Meeting of the Association for Computational Linguistics, 1994.

Yee Leung, Jiang She Zhang, Zong Ben Xu, "Clustering by Scale-Space Filtering", IEEE Transactions on Pattern Analysis and Machine Intelligence, vol. 22, No. 12, Dec. 2000, p. 1396-1410.

Richard F. Lyon, "Speech Recognition in Scale Space", Proceedings of 1984 IEEE International Conference on Acoustics, Speech and Signal Processing (ICASSP), San Diego, Mar. 1984, p. 29.3.1-4.

Malcolm Slaney and Dulce Ponceleon, "Hierarchical Segmentation Using Latent Semantic Indexing in Scale Space", Proceedings of the 2001 ICASSP, Salt Lake City, Utah, May 2001.

Andrew P. Witkin, "Scale-Space Filtering: A New Approach to Multi-Scale Description", Proceedings of the 1984 ICASSP, San Diego, Mar. 1984, p. 39.A.1.1-4.

Manmathma, R. and Srimal, N., "Scale Space Technique for Word Segmentation in Handwritten Documents", Scale-Space Theories in Computer Vision, 2$^{nd}$ International Conference, Scale-Space '99, Proceedings, p. 22-23, 1999.

Miller, N.E., Wong, P.C., Brewster, M. and Foote, H.P., "Topic Islands(TM)—A Wavelet-Based Text Visualization System", in Ebert D., Hagan, H., and Rushmeier, H. (eds), Proceedings of IEEE Visualization '98, p. 189-196, New York, NY, Oct. 18-23, 1998, ACM Press, also available at multimedia.pnl.gov:2080/topicography/vis98paper.pdf.

S. Srinivasan et al., "What is in that video anyway? : In Search of Better Browsing", Proceedings, IEEE International Conference on Multimedia Computing and Systems, p. 388-393, Florence, Italy, Jun. 7-11, 1999.

S. Dumais, "Enhancing Performance in Latent Semantic Indexing", Bellcore Technical Report TM-ARH-017527, 1990.

S. Dumais, G. Furnas, T. Landauer, S. Deerwester, R. Harshman, "Using Latent Semantic Analysis to Improve Access to Textual Information", Proceedings of Computer Human Interaction '88, 1988.

M. Slaney, D. Ponceleon, J. Kaufman, "Multimedia Edges: Finding Hierarchy in all Dimensions", Proceedings of 9$^{th}$ ACM International Conference in Multimedia, Ottawa, Ontario, Sep. 30-Oct. 5, 2001.

M. Slaney, D. Ponceleon, J. Kaufman, "Temporal Events in All Dimensions and Scales", Proceedings of the IEEE Workshop on Detection and Recognition of Events in Video, Jul. 8, 2001, Vancouver Canada.

M. R. Naphade et al., "A Factor Graph Framework for Semantic Indexing and Retrieval in Video", 0-7695-0695-X/00, 2000, IEEE.

M. R. Naphade et al., "Semantic Video Indexing using a probabilistic framework", International Conference on Pattern Recognition (ICPR'00), 1051-4651/00, 2000, IEEE.

Anni Coden et al., "Multi-Search of Video Segments Indexed by Time-Aligned Annotations of Video Content", IBM Research Disclosure Mar. 2000, n431191, p. 603.

Malcolm Slaney and Dulce Ponceleon, "Hierarchical Segmentation: Finding Changes in a Text Signal", Proceedings of the SIAM Text Mining 200 Workshop, Chicago IL, Apr. 7, 2001, p. 6-13.

* cited by examiner

SYSTEM AND METHOD FOR HIERARCHICAL SEGMENTATION WITH LATENT SEMANTIC INDEXING IN SCALE SPACE

FIELD OF THE INVENTION

This invention relates to automatically generating a hierarchical table of contents for indexing a document and identifying clusters of related information in the document. Specifically, the invention combines latent semantic indexing techniques to identify related blocks and major topic changes within the document with scale space segmentation techniques to evaluate topic changes within the identified blocks.

DESCRIPTION OF RELATED ART

As computational horsepower, interconnection, and storage capacity increase and equipment prices decline, computer users are being increasingly swamped with multimedia data. Unfortunately, given a file or document including an audio or a video signal, there is little readily-available information that can help computer users find their way around such a time-based signal. Technical papers usually have major and minor headings, so that the semantic structure or order in which the topics are presented is made clear. Professional presentations are often also structured, but this structural information is hidden in the signal. Videotapes are particularly difficult to browse as there is often an hour or more of both image and sound content, and there is no roadmap to help viewers find their way through the themes or topics presented.

There has been significant prior work in the field of automated information retrieval, but most of this work has dealt with collections of text-based documents. U.S. Pat. No. 4,839,853 to Deerwester et al. teaches a methodology for retrieving textual data objects from a collection of documents by moving the problem into the statistical domain. Deerwester presumes that there is an underlying, latent semantic structure in the usage of words in the data objects. The structure in word usage data is however partially hidden or obscured by the variability of word choice due to synonymy (use of different words to describe the same object or concept) and polysemy (re-use of the same word for more than one distinct meaning). Deerwester constructs a "term-by-document" matrix having rows corresponding to search terms and columns corresponding to different documents, and cell entries describing the numerical frequency of occurrence of respective terms in respective documents. The matrix is then reduced via singular-value decomposition, and objects are compared by dot products between points in the resulting vector representation of the collection. Latent semantic indexing has proven to be a powerful means to summarize the semantic content of a document and to measure the similarity of two documents or a query and a document. There is no need to know beforehand all the keywords that would occur in a table of contents in order to produce an index or outline of the document when a document is statistically described by its own inherent structure.

U.S. Pat. No. 4,658,372 to Witkin teaches scale space filtering, wherein a continuous analysis discerns events of interest in a signal at all observable scales. Scale space theory deals with the importance of scale in any physical observation, i.e. objects and features are relevant only at particular scales. Witkin introduced the idea to find the boundaries in a signal, but the Witkin invention is also applicable to segmentation, which is the mapping of continuous media into discrete units enabling indexing.

Generally, the goal of scale-space segmentation is to detect changes of varying size in a signal at all scales, and thus identify corresponding major and minor changes in the signal. Typically, a scale space segmentation tool applies filter windows of increasingly narrow resolution to the signal to find changes in semantic structure that are similar to the window resolution. Witkin generates a scale space image of the raw data signal, a two-dimensional surface, by convolving the signal with a continuum of Gaussian functions. Witkin then identifies discrete points at which new qualitative features appear in the scale space image by analyzing derivatives of the scale space image in the direction of lines of constant scale. The Witkin invention then constructs a tree structure to identify features in successively finer detail based on the persistence of events with respect to scale. Lyon extended this idea to vector spaces (see Richard F. Lyon, "Speech Recognition in Scale Space", Proc. of 1984 ICASSP, San Diego, March, pp. 29.3.1–4, 1984).

R. Manmathma and Nitin Srimal, in "Scale Space Technique for Word Segmentation in Handwritten Documents", Scale-space Theories in Computer Vision, Proceedings of International Conference, $2^{nd}$, Corfu, Greece, September 26–27, 1999, Scale-space '99 (Lecture Notes in Computer Science, vol. 1682), p. 22–33, describe an example use of scale space segmentation in a computer vision system designed to pick out words from manuscript "blobs". Analysis of the extent of "blobs" in a scale space representation of a handwritten document image controls the segmentation of the image. Image matching then creates lists containing instances of the same word. Starting from an original image in scale space, successively smoothed images are generated along the scale dimension.

U.S. Pat. No. 6,070,133 to Brewster et al. teaches the representation of a text document as a vector of weights with each weight corresponding to a particular word in the text. A cosine similarity measure on the full set of words within each block of text compares adjacent blocks of text. The Brewster invention then generates a visual representation of the semantic structure of the document, so that topic evolution within the document is discernable without requiring a user to read the document. The papers cited above by Lyon, Manmathma et al., and U.S. Pat. Nos. 4,658,372, 4,839,853, and 6,070,133 are hereby incorporated by reference.

While the aforementioned prior art references are useful improvements in the field of information retrieval, there still exists a need for an improved method for automatically generating a table of contents for a document, particularly when that document is not limited to text.

SUMMARY OF THE INVENTION

It is accordingly an object of this invention to automatically generate a hierarchical table of contents or outline for indexing a document, using information contained in the document. The table of contents describes the major and minor topic changes in the document in a sequential manner. The document may comprise a text file, an audio file, a video file, or a multimedia presentation. Audio files can include music and speech, and text files can comprise a transcript of an audio file or the soundtrack of a multimedia presentation.

It is a related object that modified latent semantic indexing techniques map the words of the document into a quantitative semantic space. The invention builds a model of the document, including an initial semantic structure that determines how the document should be partitioned into blocks or subdocuments for most effective subsequent analysis. The model is built by defining a vector of terms occurring in the document and then mapping the document into a vector space by counting and scaling the terms into a term occurrence histogram. The terms may include individual words, phrases, sentences, paragraphs, and specific images or shots in video data. The terms can be locally and globally weighted. Singular-value decomposition can further summarize the occurrence of terms in the document, reducing the dimensionality of the data to be outlined.

The initial semantic structure can be illustrated by finding regions of strong self-similarity in a matrix representation of the document model. Such regions correspond to clusters of related information in the document. Edges of strongly self-similar regions correspond to the major changes in the semantic structure of the document.

It is a related object that scale space segmentation techniques find topic changes of various sizes within the identified blocks. The invention detects changes in the semantic structure of the document that span different scales. The invention filters the through successively smaller scale windows. The filter windows may be Gaussian in shape. The result is a map of the changes in the document versus the scale at which changes are evident. Major changes will span a wide range of scales, while minor changes are significant only over a more limited range of scales.

The invention identifies local peaks in the contour map by detecting points at which the magnitude of the vector derivative in the vector space are maximum. The invention then traces these peaks from the largest scale back to the point at which a semantic structure change originated. The length of the path traced out by the peaks is a measure of the span of scales over which each change in semantic structure exists, i.e. how significant a particular topic change is.

The invention then orders the detected semantic structure changes into entries in the table of contents based on the range of scales spanned by each change. Finally, the invention visually presents the semantic structure of the document to a user.

In a preferred embodiment, the invention combines audio data and video data into a single unified document representation to facilitate analysis. Description of frames in a video file by a number that represents intensity data for each displayed color, where the axis for such data may be logarithmically scaled, greatly reduces the dimensionality of video data. The invention generally aligns video data in time with any corresponding audio data and may weight the video data so it doesn't overwhelm the audio data.

The foregoing objects are believed to be satisfied by the embodiments of the present invention as described below.

DETAILED DESCRIPTION OF THE INVENTION

The present invention provides a method for automatically generating a table of contents for a document using information in the document. The document may comprise a text file, an audio file, a video file, or a multimedia presentation.

There are two different fundamental phases in the operation of the invention. In the first phase, a model of the document is built using latent semantic indexing (LSI) and singular-value decomposition (SVD). The invention extends existing latent semantic indexing methods to describe the semantic content within a single document. This model of the document reduces the dimensionality of the problem while addressing synonymy and polysemy. The semantic content of the document is represented as a signal that varies through the document. The position of a document portion can thus be described in a multi-dimensional semantic space, e.g. as a text document is read, its sentences trace a trajectory through the semantic space. (Similarly, sounds in audio data and color in video data can also be described in a low-dimensional semantic space.) Singular-value decomposition defines an approximate representation of the document along dimensions that best describe its semantic trajectories. The invention then partitions the document into related portions or subdocuments according to the semantic structure thus identified. The angle between two subdocuments is the "distance" between them in semantic space.

Figure 1:
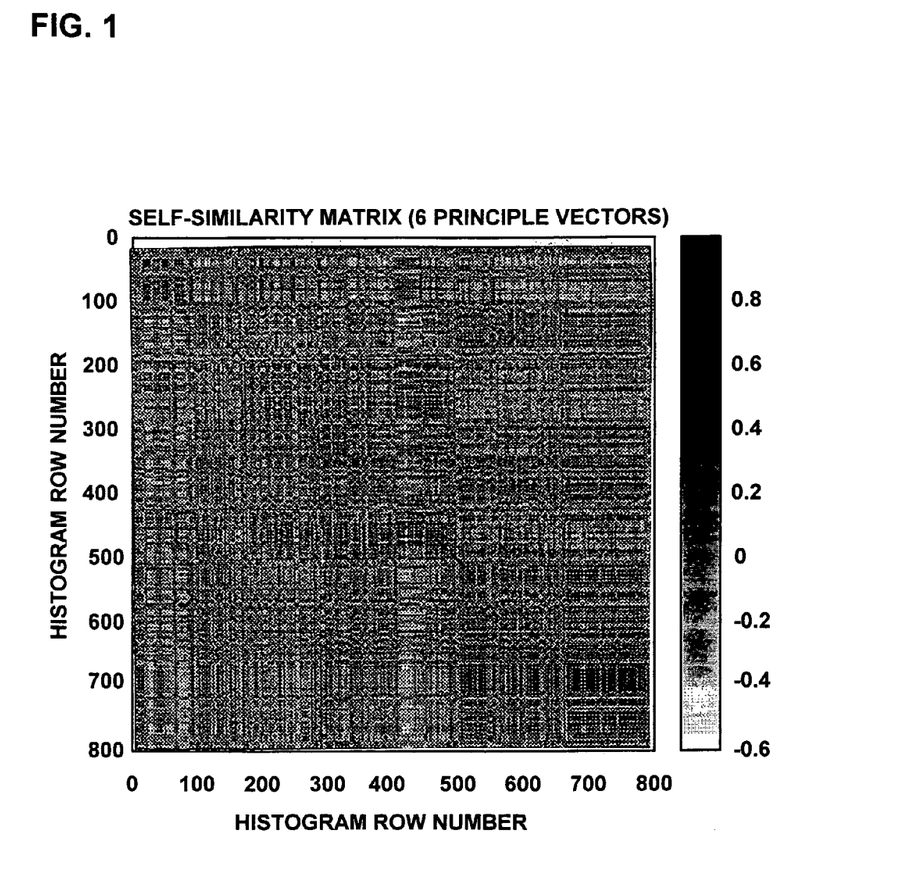
FIG. 1 is a plot of self-similarity matrix data.

In the second phase, the invention projects histogram data for the same document into the latent semantic indexing subspace, and performs scale space filtering on this data. Scale space describes the features of the document at many different scales. The invention repeatedly low-pass filters the document signal segments to compute the semantic path of the document at many different time scales. The invention then identifies local peaks in the magnitude of the vector derivative and traces each of them back through scale space to an original point of change. Trace lengths determine whether changes are major or relatively minor. The persistence of points of topic change at all different scales determines the hierarchical segment boundaries and corresponding entries in the table of contents for the document. Referring now to FIG. 1, a plot of self-similarity matrix data is shown. The first embodiment of the present invention operates on a text document, and treats each sentence as the basic unit of initial analysis. This embodiment may include software executing on a conventional digital computer. Sentences may be marked by periods, but in cases where sentence boundaries are not available then text can be arbitrarily divided into 20 word "sentences", for example. Alternately, groups of sentences can be analyzed together. A speech recognition engine, such as the ViaVoice (R) product available from IBM Corporation, can generate a text file as a transcript of an audio file, but may introduce some errors. A technique such as latent semantic indexing should fail gracefully in the event of word errors, and can easily take into account multiple word hypotheses as produced by a speech recognition engine. The present invention is thus language-independent. Furthermore, the invention is not limited to text analysis. Music also has an acoustic structure, e.g. key changes, rhythm changes, etc. which tell something about the high-level structure of the musical piece. This inherent structure can be used to partition music into important temporal segments.

The operation of the first embodiment is described in terms of an experimental analysis performed on a long chapter from a book on tomography, *Principles of Computerized Tomographic Imaging*, by A. C. Kak and Malcolm Slaney, IEEE Press, 1998. The chapter was scanned in and subjected to optical character recognition. Figure captions and equations were included with the text, as each page was scanned in raster order. This actually makes segmentation more difficult since the text and the corresponding figure captions are sometimes separated by pages. The reference section was not included in the analysis since it is organized alphabetically and is not topically structured. Words that include digits were removed. Words from a list of 398 stop words were removed before analysis. The chapter contained 1093 sentences, and after removing stop words there were 1830 distinct words. Stemming was not performed. There are some errors in the text due to the use of OCR.

Normally, in information retrieval, each document is but one selection from a large collection of documents from which a best match is desired. In this invention, however, a single document is being analyzed and is regarded as a collection of subdocuments. In the first phase of this embodiment of the invention, these subdocuments are initially individual sentences because a sentence generally contains one thought. The statistical model being developed describes the occurrence of terms within those subdocuments. In this embodiment those terms are individual words, but the invention is not limited to this interpretation. Alternate embodiments employing larger subdocuments, or documents keyed by other parameters of a file might be more useful. For example, in a video transcript, the invention can operate on a fixed number of words, look for pauses, or look for scene breaks as determined by color histogram data.

Choosing the appropriate subdocument size when using latent semantic indexing within a single document is important, and can limit the effectiveness of document analyzers that rely solely on latent semantic indexing. Placing the entire document into a single histogram gives very little information that can be used to segment the document. On the other hand, splitting the document into one-word chunks is too fine because there is no way to link one word to another. The power of latent semantic indexing is best captured in this first embodiment when a subdocument is a small chunk of text, because words that occur in close proximity are linked together by the histogram data.

The invention first groups the document content (semantic data) into a time sequence of sentences $\{s_i\}$. The invention creates a histogram of word frequencies $H(s_i)$ from the sequence of sentences, where $H(s_i)$ is a vector function of sentence number $s_i$. (Index i may be a time index as described below in more detail with respect to the preferred embodiment.) As suggested by S. T. Dumais in "Improving the retrieval of information from external sources", Behavior Research Methods, Instruments & Computers, 23, p. 229–236, 1991, incorporated herein by reference, the present invention uses local (log of term frequency+1) and global term weighting (entropy of the term frequency).

A singular-value decomposition of the full histogram $X=H(s_i)$ then produces a k-dimensional representation $H^k(s_1)=X^k$ of the document's semantic path. The dimensionality k, which is ten in this case, is much less than the original histogram. The vector of terms occurring in the document is mapped into a vector space by projecting scaled term-occurrence histogram data onto the vector. Singular-value decomposition provides a principled way to reduce the dimensionality of a signal in a manner which is optimum, in a least-squared sense, and is well known in the art of signal processing. Details of the implementation of singular-value decomposition are provided in a subsequent description of the preferred embodiment.

The angle between two points in the latent semantic indexing space is a measure of the similarity of the two document portions represented by those points. The angle is measured by computing the dot product of the two filtered and normalized vectors; this gives the cosine of the angle between the two directions. A distance metric is generated by the subtraction of the cosine from one. The use of angles versus Euclidean distance for similarity measurement is of particular utility. A simple 'sentence' such as "Yes!" has the same semantic content as "Yes, Yes!" yet the second 'sentence' contains twice as many words and will have a vector magnitude in semantic space that is twice as large. An angular measure of similarity is not confused by such a situation.

FIG. 1 shows the semantic similarity between the i-th and j-th sentences in Chapter 4 of the aforementioned tomography book. As expected along the diagonal, each sentence is completely identical to itself, but more importantly the matrix exhibits a block-diagonal structure. Each square block on the diagonal is a sequential group of sentences that are on the same topic and are related to each other. These self-similar blocks vary in size and similarity level. Boundaries between self-similar blocks, where similarity measures change drastically, illustrate the major changes in the semantic structure of the document. An initial model of the semantic structure of the document can thus be based on identification of the related blocks and the boundaries between them. The invention can partition the document into these blocks for subsequent analysis by automated scale space segmentation techniques.

Choi (F. Choi, "Advances in domain independent linear text segmentation," Proceedings of NAACL '00, Seattle, USA, April 2000, hereby incorporated by reference) and Foote (Jonathan Foote, "Visualizing Music and Audio using Self-Similarity," Proceedings of ACM Multimedia '99, pp. 77–80, Orlando, Fla., November 1999, hereby incorporated by reference) represent a document (text and audio, respectively) in terms of its self-similarity matrix. The inventions above identify edges of square regions of the self-similarity matrix and characterizes them by strength. Hearst (M. A. Hearst, Multi-paragraph segmentation of expository text, Proceedings of the $32^{nd}$ Annual Meeting of the Association for Computational Linguistics, 1994, hereby incorporated by reference) uses the dips in a similarity measure of adjacent sentences in a document to identify topic changes because the size of the dip is a good indication of the relative amount of change in the document. The present invention extends these ideas by using scale space techniques to automatically identify similarity or dissimilarity over larger portions of the document than would be possible with the ad hoc method described above.

Figure 2:
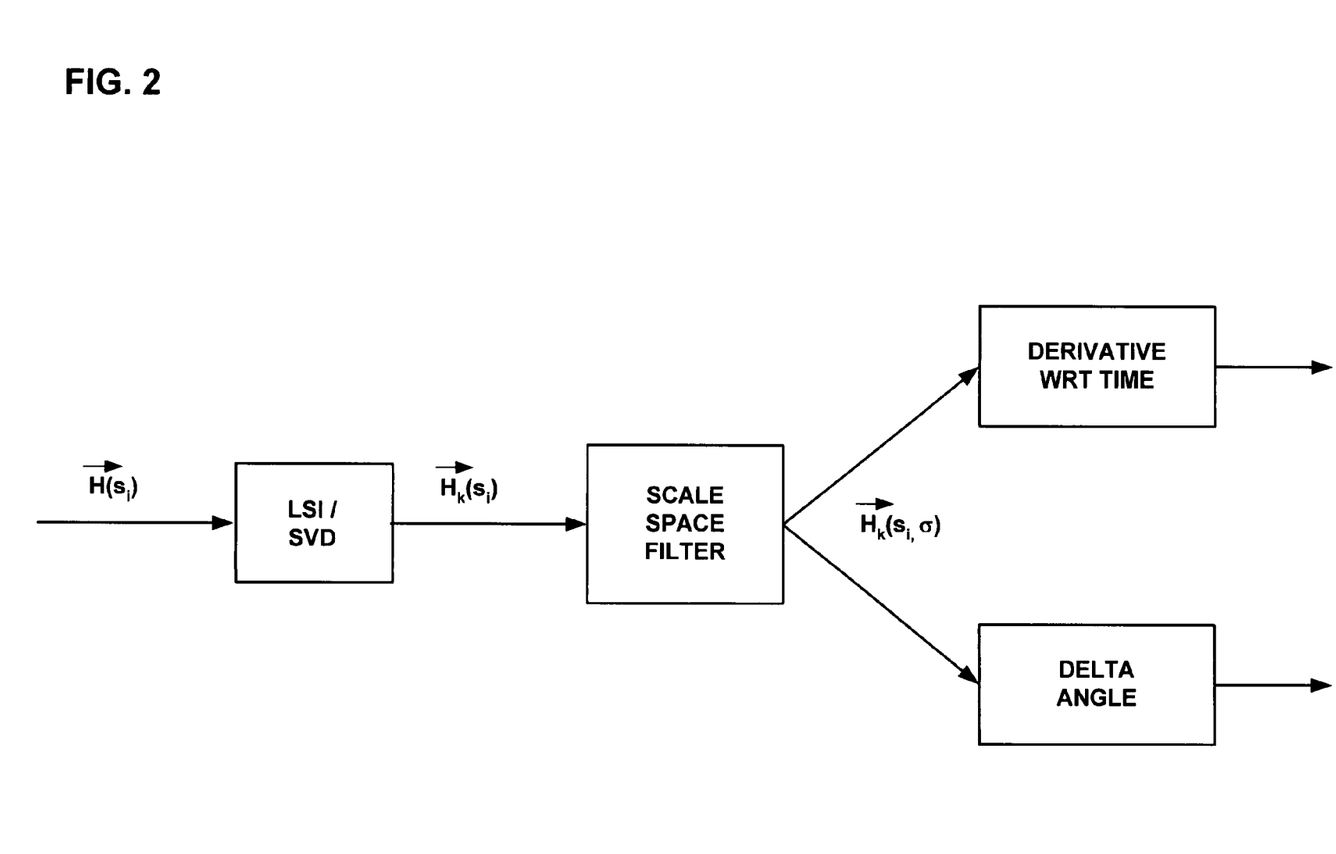
FIG. 2 is a diagram of the combined latent semantic indexing and scale space segmentation method according to a first embodiment of the present invention.

Referring now to FIG. 2, a diagram of the combined latent semantic indexing and scale space segmentation method according to a first embodiment of the present invention is shown. Witkin introduced the idea of scale space segmentation to find the boundaries in a signal. In scale space, a signal is analyzed with many different kernels that vary the size of the temporal neighborhood that is included in the analysis at each point in time. If the original signal is x(t), then the scale space representation of this signal is given by:

$$x_\sigma(t) = \int x(\tau) g(\sigma, t-\tau) d\tau$$

where $g(\sigma, t-\tau)$ is a Gaussian kernel with a variance of $\sigma^2$. With a $\sigma$ approaching zero, $x_\sigma(t)$ is nearly equal to x(t). For larger values of $\sigma$, the resulting signal, $x_\sigma$, is smoother because the kernel is a low-pass filter. Thus a one-dimensional signal is transformed into a two-dimensional image, and the analysis scale is a continuous and explicit parameter. Non-Gaussian filter windows can be employed by the present invention.

Latent semantic indexing converts the subdocument histograms $H(s_i)$, which are vector functions of sentence number, into a k-dimensional representation of the document's semantic path $H^k(s_i)$. In the scale space segmentation phase, the invention low-pass filters each dimension of the reduced histogram data $H^k(s_i)$ by replacing X in the above equation with each component of $H^k(s_i) = [H_1(s_i) H_2(s_i) \ldots H^k(s_i)]^T$ to find a low-pass filtered version of the semantic path. The result is $H^k(s_i, \sigma)$, a k-dimensional vector function of sentence number and scale. The invention further analyzes $H^k(s_i, \sigma)$ by computing its derivatives with respect to time (or sentence number) and by computing the angular change of the semantic trajectory with different amounts of low-pass filtering.

Figure 3:
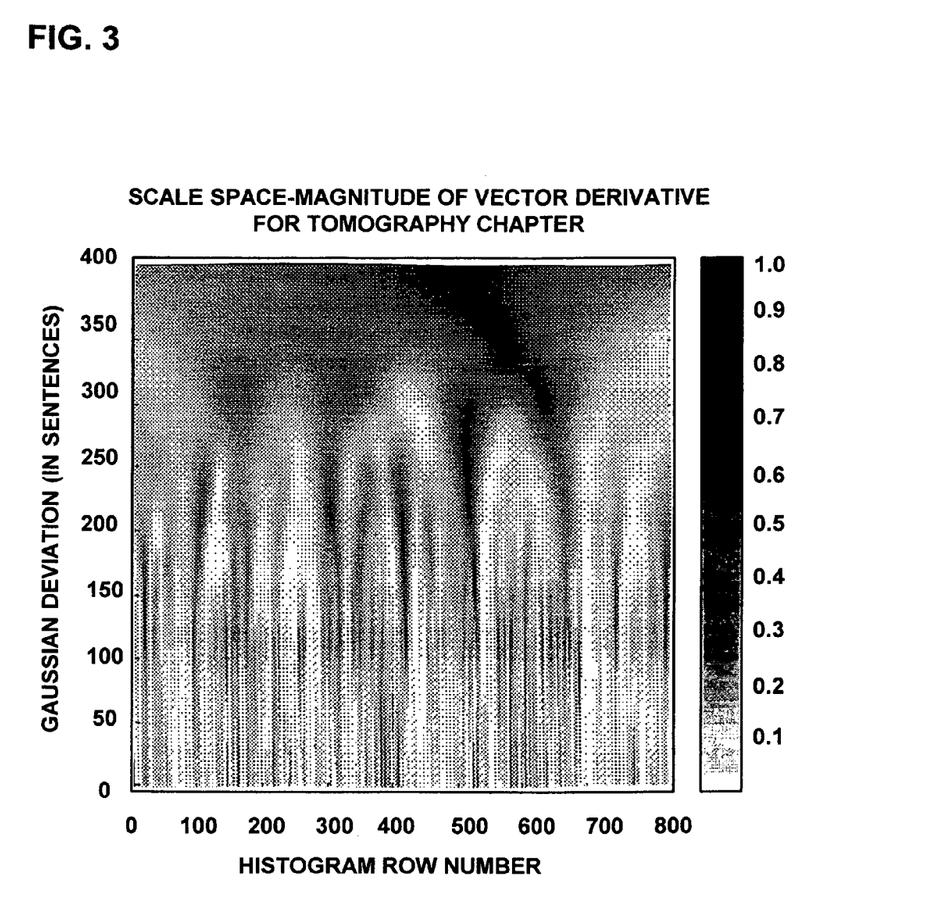
FIG. 3 is a plot of scale space vector derivative magnitude according to a first embodiment of the present invention.

Referring now to FIG. 3, a plot of scale space vector derivative magnitude according to the first embodiment of the present invention is shown. This plot shows the cosine of the angle of the vector derivative as a function of sentence number for the tomography chapter (horizontal axis) and scale (vertical axis). At the bottom, where the scale is small, there are many small changes in topic. These topic changes are gradually filtered out as the invention moves to the larger scales. The largest peak, which starts around sentence 500 in the coarsest scale, goes back to the point in the chapter there the text moves from discussing different forms of tomography to how tomography and magnetic resonance imaging are related. (The sentence numbers in FIG. 3 are not the same as those in subsequent figures because some "sentences" have no content after dropping stop words and are deleted from the singular-value decomposition analysis. The sentence counts are adjusted to the true numbers after the peaks are found).

FIG. 3 is a segmentation map of the document, depicting changes in the document versus the scale or resolution level at which document changes are evident. The invention looks for points in a smoothed version of the data where the difference between neighboring topics reaches a local maximum. The scale space filtered semantic path thus forms the basis of the hierarchical segmentation method of the present invention.

An important property of scale space segmentation is that the length of the boundary between topics in scale space is a metric for the importance of the boundary. It is useful to think about a point representing the document's local content wandering through the latent semantic indexing space in a pseudo-random walk. Each sentence is a slightly different point in space and the objective is to find large jumps in the topic space. As the latent semantic indexing representation is low-pass filtered, the point moves more sluggishly. It eventually moves to a new topic, but small variations in the topic do not move the point very much. Thus the boundaries that persist at the largest scales are the biggest changes in the document.

Another important feature of scale space is that the resulting image is a continuous function of the scale parameter. Because a local maximum in scale space is well behaved, the invention can start with a peak in the signal at the very largest scale and automatically trace it back to the exact point at zero scale where it originates (see "Uniqueness of the Gaussian Kernel for Scale-Space Filtering" by Jean Babaud et al., IEEE Transactions on Pattern Analysis and Machine Intelligence, vol. PAMI-8, no. 1, January 1986, p. 26, which is hereby incorporated by reference). The range of scales over which the peak exists is a measure of how important this peak is to the signal. Changes in the signal are detected by calculating the derivative of the signal with respect to time and finding the local maximum of this derivative. Because the derivative and the scale space filter are linear, their order can be exchanged. Thus the properties of the local maximum described above also apply to the signal's derivative.

Figure 4A:
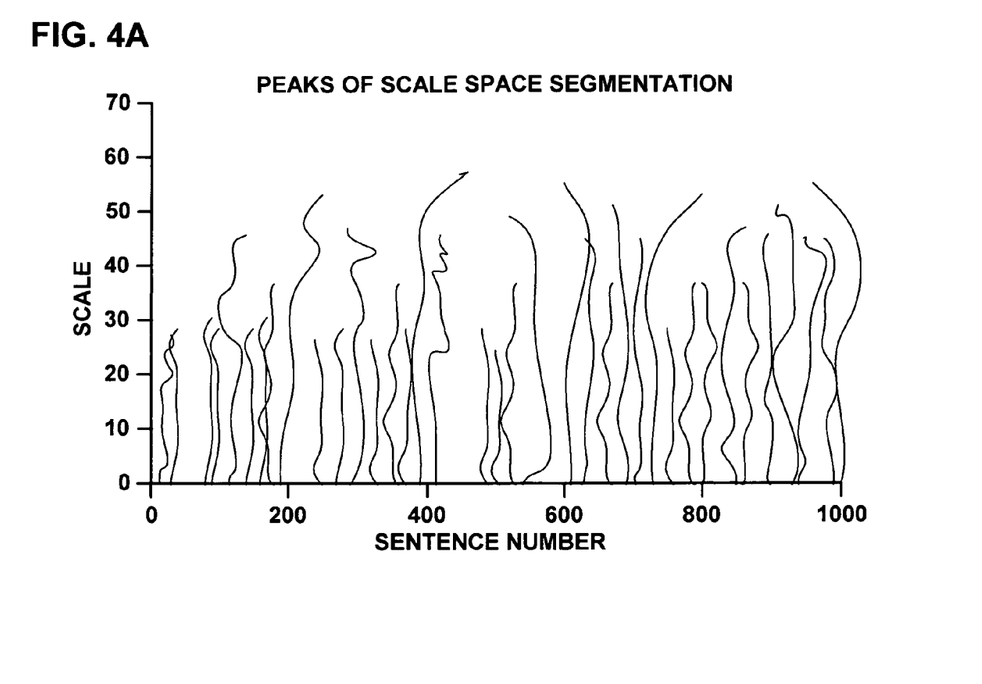
FIGS. 4A and 4B are plots of trajectories for peaks of the scale space derivative according to a first embodiment of the present invention.
Figure 4B:
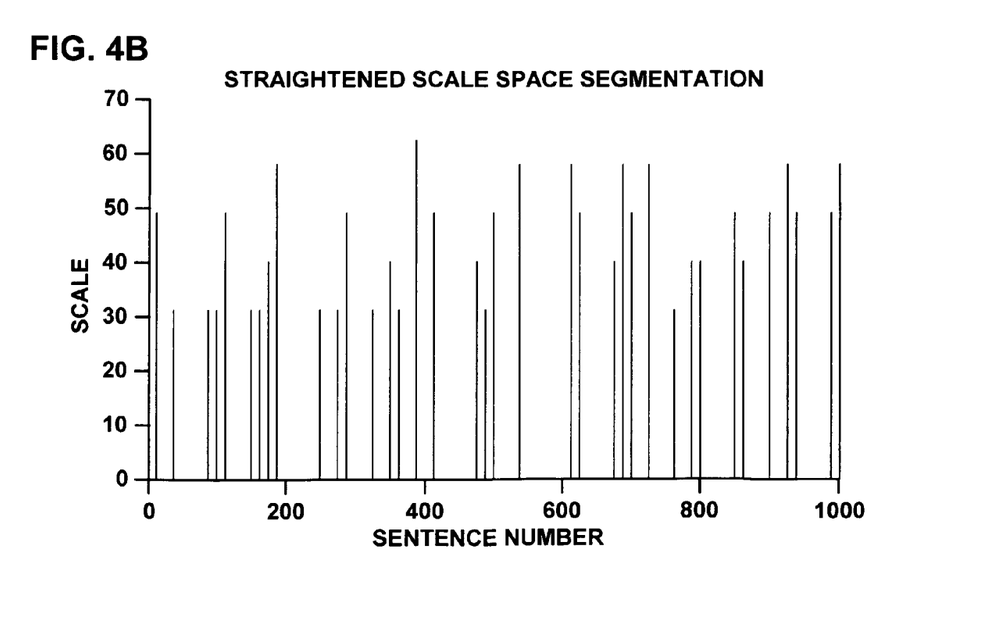

Referring now to FIG. 4A, a plot of trajectories for peaks of the scale space derivative according to the first embodiment of the present invention is shown. These trajectories correspond to the "ridge lines" of the image map of FIG. 3, that is, paths along which the scale space vector derivative magnitudes are locally maximum. The peaks are each traced back to their origins to determine the corresponding original point of change in the document. FIG. 4B shows the trajectories of FIG. 4A, but in this depiction the trajectories are straightened vertically so that the starting point of the discontinuity can be more readily discerned. The length of each line in FIG. 4B represents the range of scales where a peak exists and is thus a measure of how significant the topic change is to the document.

Figure 5:
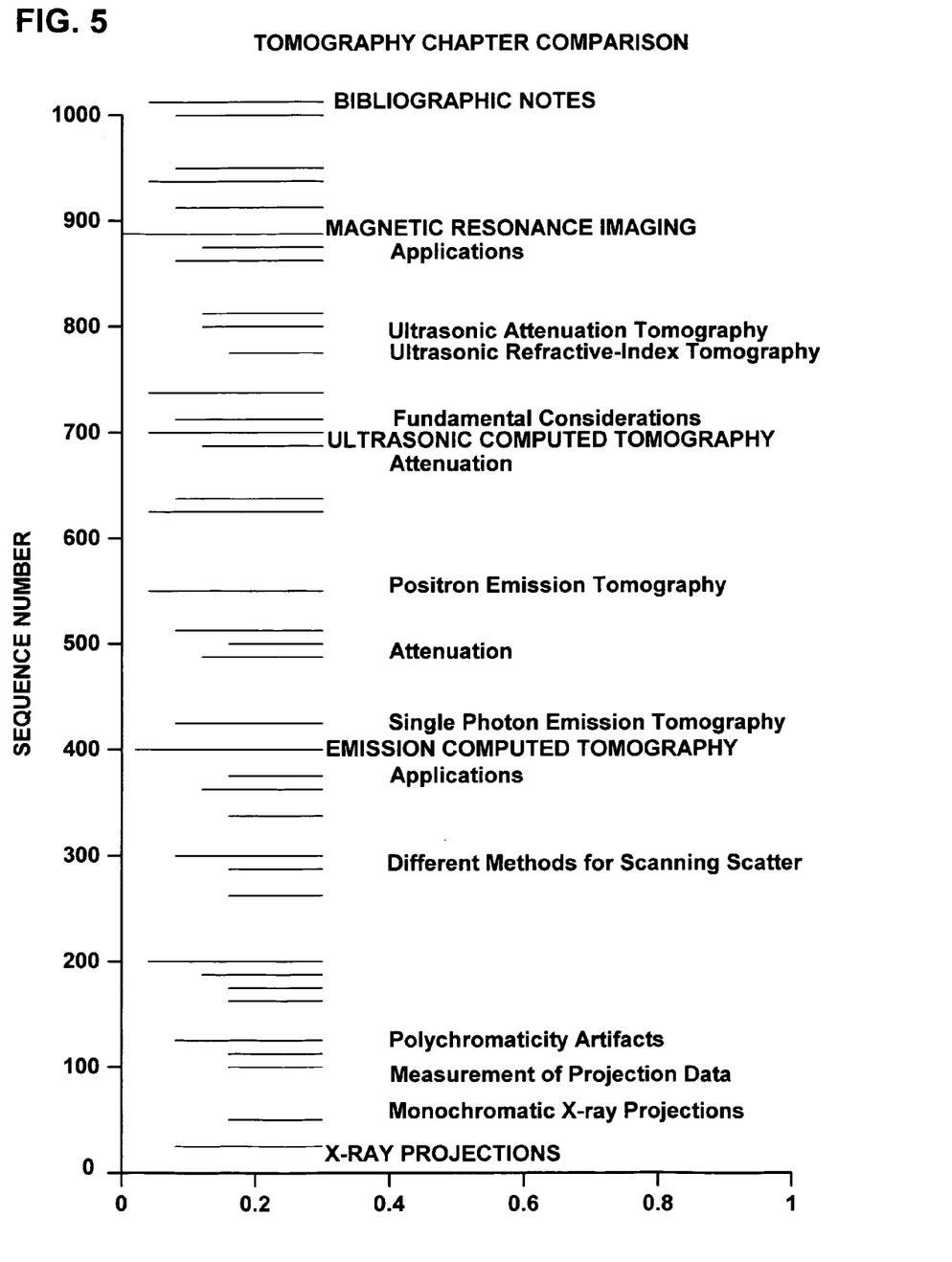
FIG. 5 is a diagram of boundary sizes and headings and subheadings according to a first embodiment of the present invention.

Referring now to FIG. 5, a diagram of boundary sizes and headings and subheadings according to a first embodiment of the present invention is shown. This figure is a comparison of the segmentation results for the tomography chapter with the actual locations of headings and subheadings in the published chapter. The strongest segmentation results correspond to topic changes that span the largest range of scales, and correspond reasonably well to chapter headings (shown in upper case). As expected, the magnetic resonance imaging section change at sentence 891 is the most important change. The other section headings are found by segment boundaries with significant strength.

Although the present invention is described in terms of an analysis of a text document, not all media are organized into such a clear hierarchy. In most text documents, the introduction presents a number of ideas, which are then explored in more detail, and then a graceful segue is used to transition between ideas. In contrast, television news shows often lack such hierarchy as they are typically designed to be watched in a linear fashion. The viewer is teased with information about an upcoming weather segment for example, and the phrase "top of the news" is repeated at various stages throughout the broadcast. Various modifications and embodiments within the scope of the invention can thus be applied to different document types for best results.

Figure 6:
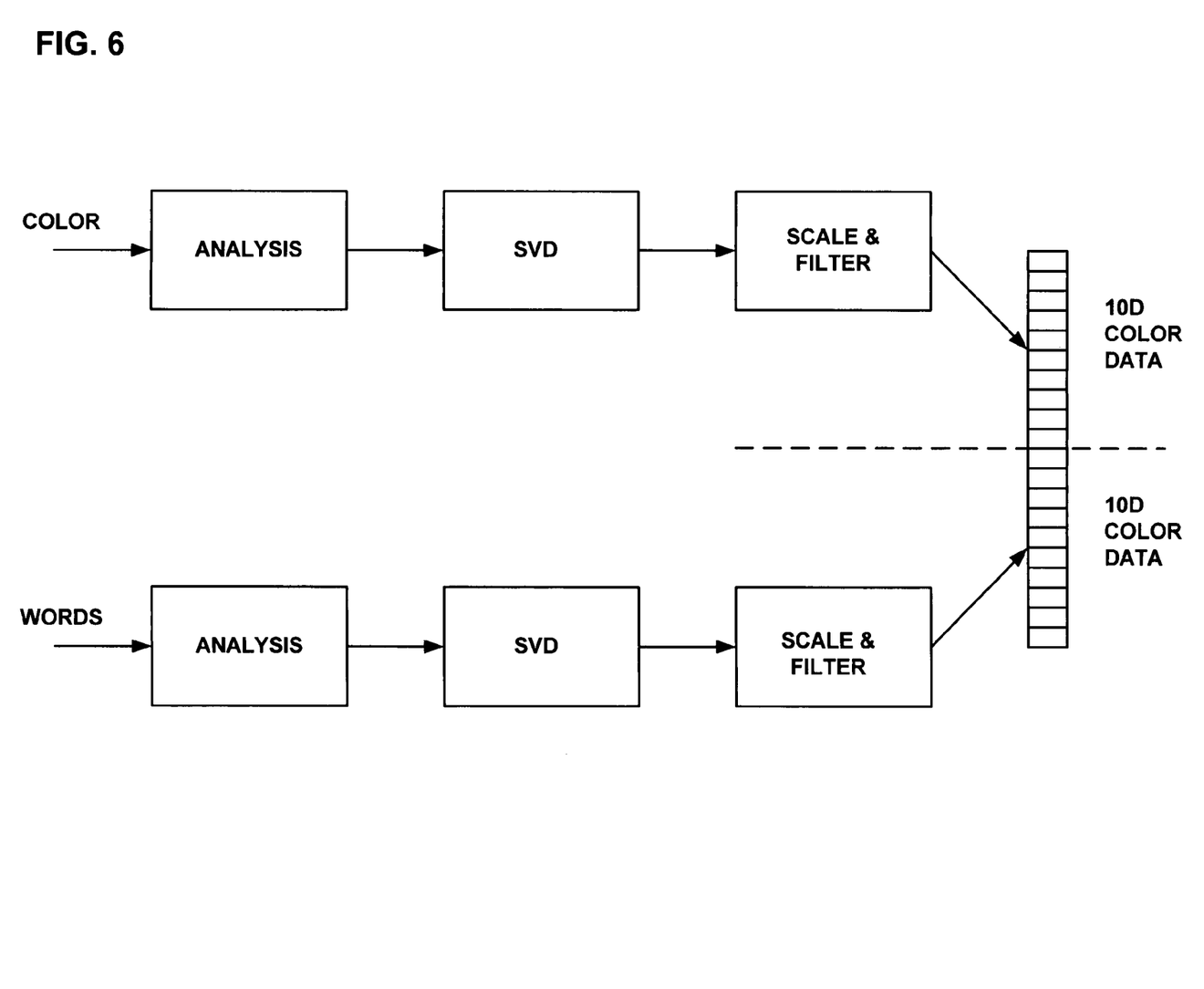
FIG. 6 is a diagram of the method for combining use of color data and word data for scale space segmentation according to the preferred embodiment of the present invention.

Referring now to FIG. 6, a diagram of the combined use of color data and word data for scale space segmentation according to a preferred embodiment of the present invention is shown. This embodiment is the same as the first embodiment, except for differences described below. The preferred embodiment is primarily designed for automatic creation of a hierarchical table of contents for videotapes. Videotapes are particularly difficult to summarize and outline, as they contain both audio data and video data, have no pre-defined table of contents, and are usually much larger than text files in terms of total file size.

The color data in the image signal and the semantic data in the audio signal provide different information about the videotape content. In video terms, a shot is a temporally contiguous set of frames taken at the same time from the same camera. Shot changes (either cuts or dissolves) can be detected well with current algorithms. While shot changes provide robust evidence for a shot change in a video signal, the overall color balance in a video does not typically change systematically over the length of the movie. In contrast, the words from the videotape narration indicate a great deal about the overall structure of the story, particularly in a documentary. The LSI/SVD step of FIG. 2 is modified in the preferred embodiment to combine audio data and video data into a single unified document representation to facilitate subsequent scale space filtering. The invention looks for large changes in both audio data and image data, and as in the first embodiment these changes represent nodes in a table of contents.

In the preferred embodiment, the original video images are sampled at 29.97 Hz and color intensity data is converted to an 8-bit number (e.g. intensities for red, green, and blue each range in value from 0 to 255). The invention condenses the digitized color information by collecting a 512-bin histogram of the color intensity values within each video frame. The 9-bit histogram bin number describes the color content of each frame as:

Bin=64 floor($\log_2(R)$)+32 floor($\log_2(G)$)+floor($\log_2(B)$)

where R=red, G=green, and B=blue intensity values, and floor converts the floating point results to integers. Logarithmic scaling tends to equalize the counts in the different histogram bins. The representation of video frame contents by a single number sharply reduces the dimensionality of video data. The invention processes audio data in transcript form as in the first embodiment. Audio data from a videotape can be condensed into a numerical representation by many different means. The present invention uses MFCC, but features that detect speech and music or even detect musical key for example can be employed.

The invention represents the color data and the semantic (e.g. word) data as two separate vectors as a function of time, and then concatenates these two vectors to create a single vector that encodes both the color and the semantic data. The invention thus describes any time point in the videotape by its position in an acoustic-color-semantic vector space. Segment boundaries are defined by large jumps in the combined color-semantic vector. The invention notes the temporal positions in the videotape where large frame-to-frame differences occur.

Singular-value decomposition can further reduce the dimensionality of input data. The singular-value decomposition, for either the color or the words, is performed in two steps. The invention collects all the features of the signal into a matrix and computes the signal's SVD to find the n left-singular vectors that best span the feature space. The same data are then projected onto these n best vectors to reduce the dimensionality of the signal. The semantic information typically starts with more than a thousand dimensions; the color information has 512 dimensions. In this application, all signals are reduced to individual 10-dimensional spaces, but this choice of dimension is not limiting. The order of the dimensions is arbitrary and meaningless; the singular-value decomposition will produce the same subspace regardless of how the rows or columns of the data matrix are arranged.

The invention expresses both audio and image data as vector-valued functions of time, x(t). Data from an entire video is assembled into a matrix, X, where the columns of X represent the signal at different times. Using a SVD, matrix X is rewritten in terms of three matrices, U, S, and V, such that X=USV$^T$. The columns of the U and V matrices are orthonormal; S is a diagonal matrix. The values of S along the diagonal are ordered such that $S_1 \geq S_2 \geq S_3 \geq \ldots S_n$, where n is the minimum of the number of rows or columns of X. The SVD enables generation of simple approximations of the original data. If the first k diagonal terms of S are retained, and the rest are set to zero, then the rank k approximation to X, or $X_k$, is the best possible approximation to X (in the least squares sense):

$$|X - X_k| = \min_{\text{rank}(Y) \leq k} |X - Y| > |X - X_{k+1}|$$

The equality in the above equation says that $X_k$ is the best approximation in all k-dimensional subspaces. The second inequality states that, as more terms are added and the size of the subspace increased, the approximation will not deteriorate (it typically improves). The first singular values are typically large; they then decay until a noise floor is reached. The objective is to keep the dimensions that are highly significant, while setting the dimensions that are dominated by noise to zero.

The columns of the U matrix are an ordered set of vectors that approximate the column space of the original data. In this case, each column of the X matrix is the value of the input signal at a different point in time. As more terms of S are used, the columns of U provide a better and better approximation to the cloud of data that forms from x(t). Given the left-singular vectors U and original data X, the data is projected into the optimal k-dimensional subspace by multiplying $X^k=(U^k)^T X$, where $U^k$ contains only the first k columns of U, and $X^k=x^k(t)$ is a k-dimensional function of time. The invention computes a new SVD and a new U matrix for each video, essentially creating movie-dependent subspaces with all the same advantages of speaker-dependent speech recognition. The reduced representation of the videotape is nearly as accurate as the original data, but is more meaningful (the noise dimensions have been dropped) and is easier to work with (the dimensionality is lower).

The final steps before combining the two independent signals are scaling and filtering. Scaling confers similar power on two independent sources of data. Typically, color histograms have larger values since the number of pixels in an image tends to be much greater than the number of words in a semantic segment. Without scaling, the color signal is hundreds of times larger than the word signal; the combined signal makes large jumps at every color change, while semantic discontinuities have little effect. The invention balances the color and semantic vectors such that both have an average vector magnitude of one. Other scaling choices are of course possible, but this balancing scheme helps ensure that the invention extracts information from both audio data and video data such that each data type is of similar overall influence.

Video data and corresponding audio data are then aligned in time. Alignment and resampling are important because the audio and image data have different natural sampling rates. The color data is typically available at the frame rate, while the word data is available only at each sentence boundary, which occurred every eight seconds on average in the Boeing 777 video. In the experiment, a new 10-dimensional vector was created by replicating each sentence's SVD-reduced representation at all the appropriate frame time. Then, based on the sentence delineations, the semantic vector was smoothed with a 2-second box-car averaging filter. The video and semantic vectors were concatenated at each frame time, turning two 10-dimensional signals sampled at 29.97 Hz into a single 20-dimensional vector.

The invention then employs scale space techniques as in the first embodiment to describe the changes in the color-semantic vector at different time scales, from a few seconds to tens of minutes.

Figure 7:
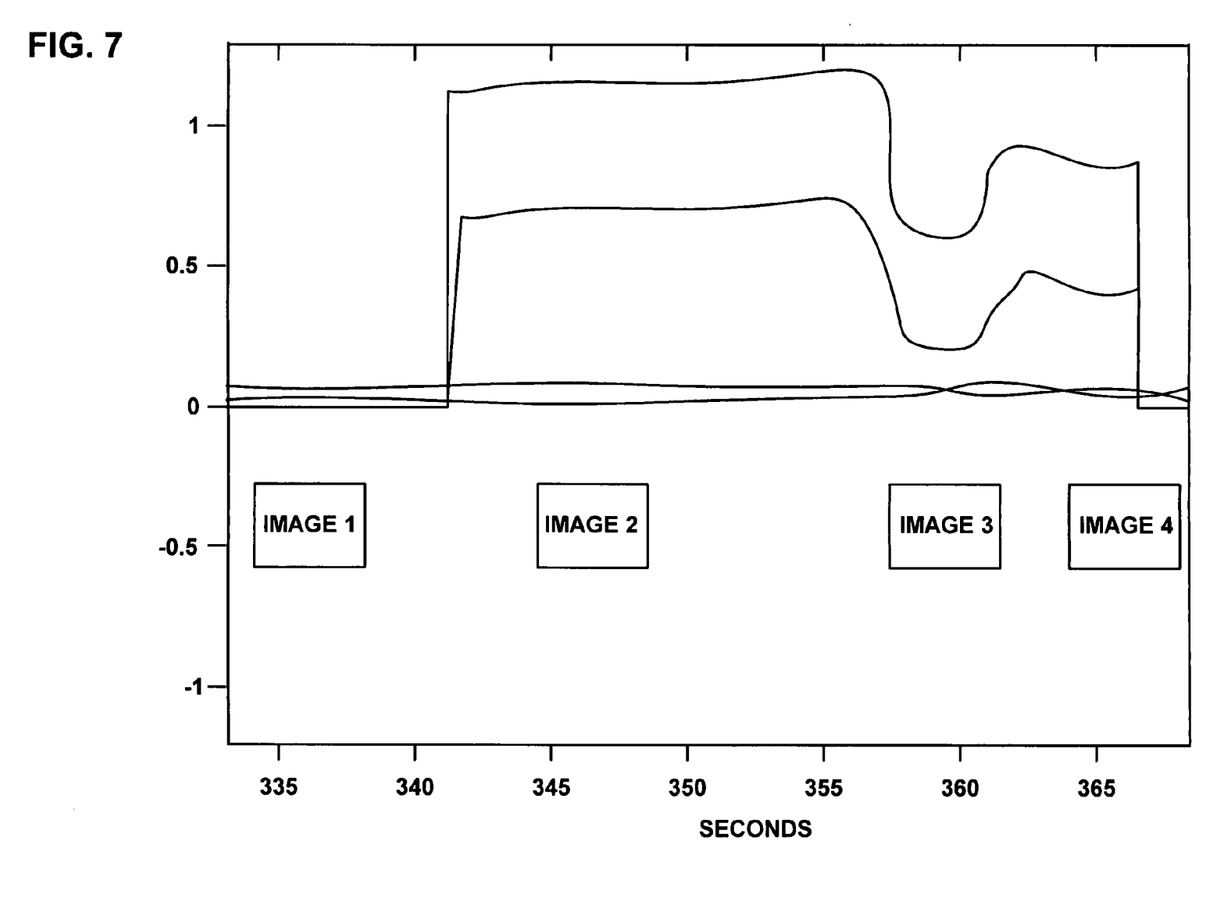
FIG. 7 is a diagram of the reduced-dimensionality color signal from a section of videotape according to the preferred embodiment of the present invention.

Referring now to FIG. 7, a diagram of the reduced-dimensionality color signal from a section of videotape according to a preferred embodiment of the present invention is shown. The videotape is the documentary "21$^{st}$ Century Jet: The Building of the 777", Channel 4, London, 1995. In an experiment to test the preferred embodiment, the invention analyzed the color information from the first hour (over 100,000 frames) of the video data, and the words from all six hours. The semantic analysis found 1314 distinct words in 537 sentences, and there were shot boundaries every 242 frames on average.

The four most significant dimensions of the reduced-dimensionality color histogram data are shown in FIG. 7. In the SVD-reduced representation, two cuts and a dissolve are readily apparent as the vector changes over time. Shot boundaries occur at 338 and 365 seconds, and are quite distinct. A dissolve occurs from 357 to 360 seconds. Sample frames from each section are also shown. The SVD representation is effective for finding shot boundaries, but is computationally more expensive than merely computing the difference between adjacent histograms. The key advantage of this approach is that color information can be combined with the words from the audio transcript to produce a better table of contents describing the videotape.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular SYSTEM AND METHOD FOR HIERARCHICAL SEGMENTATION WITH LATENT SEMANTIC INDEXING IN SCALE SPACE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

We claim:

1. A computer-implemented method for generating a table of contents for a document using information in said document, comprising:
   building a model of said document including an initial semantic structure;
   detecting hierarchical changes in said semantic structure spanning different scales by
      applying successively smaller scale filter windows to said model according to said initial semantic structure to construct a map of said changes versus scale;
      identifying local peaks in said contour map, said peaks being points of maximum vector derivative magnitude;
      tracing said local peaks back to a semantic structure change origin point;
      measuring a span of scales over which each said change exists; and
   ordering said changes into entries in said table of contents based on scale span.

2. The method of claim 1 wherein said building further comprises:
   defining a vector of terms occurring in said document; and
   mapping said document into a vector space by projecting scaled term occurrence histogram data onto said vector of terms and summarizing said terms using singular-value decomposition.

3. A system for generating a table of contents for a document using information in said document, comprising:
   means for building a model of said document including an initial semantic structure;
   means for detecting hierarchical changes in said semantic structure spanning different scales by
      applying successively smaller scale filter windows to said model according to said initial semantic structure to construct a map of said changes versus scale;
      identifying local peaks in said contour map, said peaks being points of maximum vector derivative magnitude;
      tracing said local peaks back to a semantic structure change origin point; measuring a span of scales over which each said change exists; and
   means for ordering said changes into entries in said table of contents based on scale span.

4. A computer program product comprising a machine-readable medium tangibly embodying computer-executable program instructions thereon for generating a table of contents for a document using information in said document, including:
   a first code means for building a model of said document including an initial semantic structure;

a second code means for detecting hierarchical changes in said semantic structure spanning different scales by applying successively smaller scale filter windows to said model according to said initial semantic structure to construct a map of said changes versus scale;

identifying local peaks in said contour map, said peaks being points of maximum vector derivative magnitude;

tracing said local peaks back to a semantic structure change origin point;

measuring a span of scales over which each said change exists; and a third code means for ordering said changes into entries in said table of contents based on scale span.

* * * * *